(12) United States Patent
Ooba (10) Patent No.: US 11,161,697 B2
(45) Date of Patent: Nov. 2, 2021

(54) WORK ROBOT SYSTEM AND WORK ROBOT

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 16/382,773

(22) Filed: Apr. 12, 2019

(65) Prior Publication Data
US 2019/0322467 A1 Oct. 24, 2019

(30) Foreign Application Priority Data
Apr. 23, 2018 (JP) .............................. JP2018-082420

(51) Int. Cl.
*B65G 47/90* (2006.01)

(52) U.S. Cl.
CPC ...... *B65G 47/905* (2013.01); *B65G 2203/042* (2013.01); *Y02P 90/02* (2015.11)

(58) Field of Classification Search
CPC . B65G 47/905; B65G 2203/042; B25J 9/1697
See application file for complete search history.

(56) References Cited

U.S. PATENT DOCUMENTS

| | | | |
|---|---|---|---|
| 6,141,863 A | 11/2000 | Hara et al. | |
| 10,780,579 B2* | 9/2020 | Ooba | .................... B25J 9/1687 |
| 2006/0111810 A1* | 5/2006 | Kim | ...................... B25J 19/0091 |
| | | | 700/186 |
| 2007/0007924 A1 | 1/2007 | Nishihara et al. | |
| 2010/0094453 A1 | 4/2010 | Nishihara et al. | |
| 2010/0319193 A1 | 12/2010 | Ushio et al. | |
| 2011/0010012 A1 | 1/2011 | Murayama et al. | |
| 2011/0087360 A1* | 4/2011 | Chen | ..................... B25J 9/1697 |
| | | | 700/114 |
| 2011/0208347 A1* | 8/2011 | Otake | ................ G05B 19/4182 |
| | | | 700/174 |

(Continued)

FOREIGN PATENT DOCUMENTS

| | | |
|---|---|---|
| DE | 102006031178 B4 | 8/2008 |
| DE | 102014108956 B4 | 12/2016 |

(Continued)

OTHER PUBLICATIONS

Japanese Decision of Refusal dated Sep. 15, 2020, for Japanese Patent Application No. 2018082420.

(Continued)

*Primary Examiner* — Timothy R Waggoner
(74) *Attorney, Agent, or Firm* — Karceski IP Law, PLLC (57) ABSTRACT

A work robot system includes, a work robot configured to perform a predetermined operation to a target part on an object moved by a conveyer device, a work robot controller, a sensor disposed at a predetermined position, and configured to detect a position of a detection target on the object moved by the conveyer device, and a force detector that is used when force control is performed. When the predetermined operation is performed by the work robot, the work robot controller performs force control while controlling the work robot based on a detection result of the sensor.

4 Claims, 6 Drawing Sheets

(56) References Cited

U.S. PATENT DOCUMENTS

| | | | |
|---|---|---|---|
| 2015/0005923 A1* | 1/2015 | Gu | B25J 9/1697 700/164 |
| 2017/0017224 A1 | 1/2017 | Skaggs et al. | |
| 2017/0073439 A1* | 3/2017 | Ewart | C08F 110/02 |
| 2018/0243897 A1* | 8/2018 | Hashimoto | B25J 13/025 |
| 2018/0370023 A1 | 12/2018 | Ooba | |
| 2019/0240841 A1 | 8/2019 | Ooba | |

FOREIGN PATENT DOCUMENTS

| | | |
|---|---|---|
| EP | 0884141 A1 | 12/1998 |
| EP | 2250000 B1 | 9/2011 |
| EP | 2172313 B1 | 4/2016 |
| EP | 3118709 A1 | 1/2017 |
| GB | 2428035 A | 1/2007 |
| JP | S49103358 A | 9/1974 |
| JP | S61243514 A | 10/1986 |
| JP | H05318363 A | 12/1993 |
| JP | H08-072764 A | 3/1996 |
| JP | H0872764 A | 3/1996 |
| JP | H08-286701 A | 11/1996 |
| JP | H0972717 A | 3/1997 |
| JP | 2011073128 A | 4/2011 |
| JP | 2011167831 A | 9/2011 |
| JP | 2015009324 A | 1/2015 |
| JP | 2017100273 A | 6/2017 |
| JP | 2019005856 A | 1/2019 |
| WO | 1998017444 A1 | 4/1998 |
| WO | 2009106984 A2 | 9/2009 |

OTHER PUBLICATIONS

Japanese Office Action dated Jun. 16, 2020, for Japanese Patent Application No. 2018082420.
Japanese Search Report by Registered Search Organization dated May 19, 2020, for Japanese Patent Application No. 2018082420.
U.S. Office Action dated Dec. 28, 2020, for U.S. Appl. No. 16/245,593.
U.S. Appl. No. 16/382,785, filed Apr. 12, 2019, entitled, "Work Robot System and Work Robot".
German Office Action dated Nov. 24, 2020, for German Patent Application No. 10 2019 101 756.4.

* cited by examiner

WORK ROBOT SYSTEM AND WORK ROBOT

CROSS-REFERENCE TO RELATED APPLICATIONS

This application is based on and claims priority to Japanese Patent Application No. 2018-082420, filed on Apr. 23, 2018, the entire content of which is incorporated herein by reference in its entirety.

FIELD OF THE INVENTION

The present invention relates to a work robot system and a work robot.

BACKGROUND OF THE INVENTION

Conventionally, the conveyer device is stopped in many cases when a component is assembled to an object carried by a conveyer device. In particular, when a component is precisely assembled to a large object such as a vehicle body, it is necessary to stop the conveyer device carrying the object. This often results in deterioration of work efficiency.

On the other hand, there is known a production line including a robot, a conveyer device for carrying an object, a rail provided along the conveyer device, and a moving device for moving the robot along the rail (cf. Japanese Unexamined Patent Application, Publication No. H08-72764). According to this production line, the robot performs defect inspection and polishing of the object while the object is carried by the conveyer device. Further, while defect inspection and polishing are performed, the moving device moves the robot along the rail at the same speed as the object carried by the conveyer device.

SUMMARY OF THE INVENTION

A work robot system according to a first aspect of the present disclosure includes: a conveyer device configured to move an object; a work robot configured to perform a predetermined operation to a target part on the object moved by the conveyer device; a work robot controller configured to control the work robot; a sensor disposed at a predetermined position, and configured to detect a position of one of the target part on the object moved by the conveyer device and a detection target whose position does not change relative to the target part; and a force detector configured to detect a force generated when the object comes into contact with one of a component and a tool that are supported by the work robot, wherein when the predetermined operation is performed by the work robot, the work robot controller performs force control based on a value detected by the force detector while controlling the work robot based on the detected position of one of the target part and the detection target.

A second aspect of the present disclosure provides a work robot including: an arm configured to perform a predetermined operation to a target part on an object moved by a conveyer device; a work robot controller configured to control the arm; and a force detector configured to detect a force generated when the object comes into contact with one of a component and a tool that are supported by the arm, wherein the work robot controller receives data from a measurement device having a sensor configured to detect a position of one of the target part moved by the conveyer device and a detection target whose position does not change relative to the target part, the data relating to the position, and when the predetermined operation is performed by the arm, the work robot controller performs force control based on a value detected by the force detector while controlling the arm using the data relating to the position.

DESCRIPTION OF EMBODIMENT(S) OF THE INVENTION

Hereinafter, a work robot system according to a first embodiment of the present invention will be described with reference to the drawings.

Figure 1:
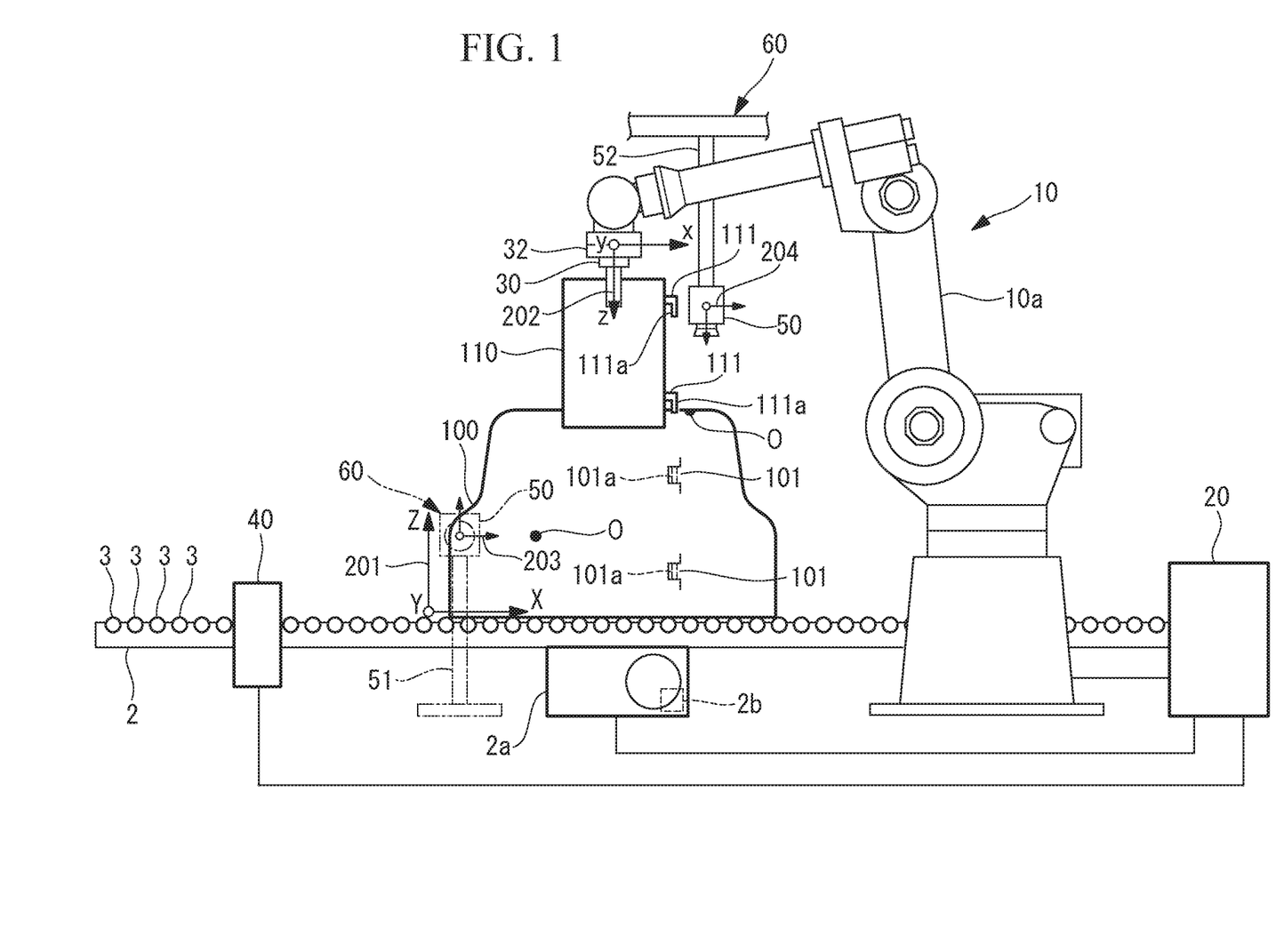
FIG. 1 is a view illustrating a configuration of a work robot system of one embodiment according to the present invention.

As illustrated in FIG. 1, the work robot system according to this embodiment includes a conveyer device 2 for carrying an object 100 as a work target, a work robot 10 for performing predetermined operation to a target part 101 of the object 100 carried by the conveyer device 2, a work robot controller 20 provided for the work robot 10, and a detection device 40 as a detection unit.

The detection device 40 detects that the object 100 has been carried to a predetermined position. The detection device 40 may obtain data that allows to identify a position and orientation of the target part 101 of the object 100 carried by the conveyer device 2. Any device having such a function can be used as the detection device 40. In this embodiment, the detection device 40 is a photoelectric sensor. In this case, the detection device 40 detects that the object 100 has been carried to its installation position. A result detected by the detection device 40 may be transmitted to controllers, or to a host controller 80 that will be described later.

While the object 100 is not limited to a specific type, the object 100 in this embodiment is a vehicle body as one example. The conveyer device 2 carries the object 100 by driving a part of a plurality of rollers 3 by a motor 2a, and in this embodiment, the conveyer device 2 carries the object 100 toward a right side in FIG. 1. Here, the motor 2a may include an operation position detection device 2b. The operation position detection device 2b sequentially detects a position and an amount of rotation of an output shaft of the motor 2a. The operation position detection device 2b is an encoder, for example, and a value detected by the operation position detection device 2b is transmitted to the work robot controller 20.

The target part 101 is a portion of the object 100 to which a predetermined operation is performed by the work robot 10. In this embodiment, as the predetermined operation, a hand 30 of the work robot 10 lifts a component 110, and the work robot 10 attaches an attachment part 111 of the component 110 to the target part 101. With this operation, for example, a shaft 111a that extends downward from the attachment part 111 of the component 110 fits within a hole 101a provided in the target part 101 of the object 100.

Here, in a state in which the object 100 is being moved by the conveyer device 2, the work robot 10 attaches the attachment part 111 of the component 110 to the target part 101.

Figure 2:
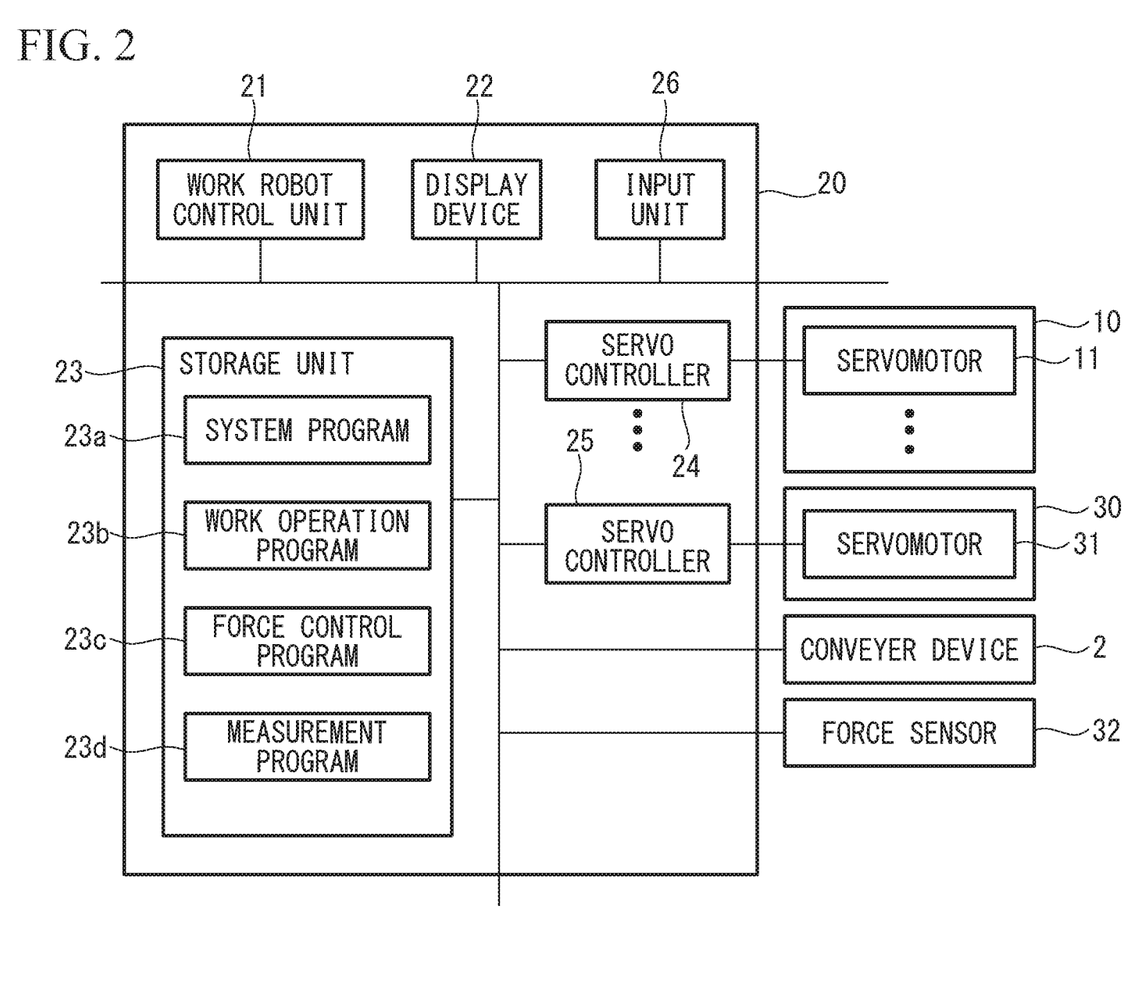
FIG. 2 is a block diagram of a work robot controller of the work robot system according to this embodiment.

While the work robot 10 is not limited to a robot of a specific type, the work robot 10 in this embodiment includes a plurality of servomotors 11 respectively driving a plurality of movable parts (cf. FIG. 2). Here, the plurality of movable parts constitute an arm 10a of the work robot 10. Each of the servomotors 11 includes an operation position detection device for detecting its operational position, and one example of the operation position detection device is an encoder. A value detected by the operation position detection device is transmitted to the work robot controller 20.

At a distal end of the arm 10a of the work robot 10, the hand 30 is attached. While the hand 30 according to this embodiment causes a plurality of claws to hold the component 110, it is possible to use a hand that supports the component 110 using a magnetic force, suctioning of air, a combination of these, and the like.

The hand 30 includes a servomotor 31 for driving the claws (cf. FIG. 2). The servomotor 31 includes an operation position detection device for detecting its operational position, and one example of the operation position detection device is an encoder. A value detected by the operation position detection device is transmitted to the work robot controller 20.

Here, as the servomotors 11 and 31, various types of servomotors such as rotary motors and linear motors may be used.

At the distal end of the arm 10a of the work robot 10, a force sensor 32 is attached as a force detector. The force sensor 32 detects forces in directions in an x axis, a y axis, and a z axis in a force sensor coordinate system 202 illustrated in FIG. 1 for example, as well as forces about the x axis, the y axis, and the z axis.

In this embodiment, a conveying direction by the conveyer device 2 is consistent with the X-axis direction in a reference coordinate system 201 illustrated in FIG. 1, a vertical direction is consistent with the Z-axis direction illustrated in FIG. 1, and the Y-axis direction illustrated in FIG. 1 is taken to be consistent with a width direction of the conveyer device 2.

The force sensor 32 may be any sensor that can detect a direction and a magnitude of a force applied to the hand 30 or the component 110 held by the hand 30. Therefore, while the force sensor 32 is provided between the work robot 10 and the hand 30 in this embodiment, the force sensor 32 may be provided within the hand 30 or within the work robot 10.

As illustrated in FIG. 2, the work robot controller 20 includes a work robot control unit 21 having a CPU, a RAM, and the like, a display device 22, a storage unit 23 having a non-volatile storage, a ROM, or the like, a plurality of servo controllers 24 respectively corresponding to the servomotors 11 of the work robot 10, a servo controller 25 corresponding to the servomotor 31 of the hand 30, and an input unit 26 connected to the work robot controller 20. In other words, the work robot controller 20 controls the arm 10a and the hand 30 of the work robot 10. One example of the input unit 26 is an input device such as an operation panel that can be carried by an operator. The input unit 26 may wirelessly communicate with the work robot controller 20.

As illustrated in FIG. 1, the work robot system according to this embodiment includes a plurality of measurement devices 60. Each of the measurement devices 60 includes a sensor 50. The number of the measurement devices 60 used in this embodiment is two. The number of the measurement devices 60 can be one.

The sensors 50 of the plurality of measurement devices 60 are respectively disposed at predetermined positions. As illustrated in FIG. 1, in this embodiment, the sensors 50 of the two measurement devices 60 are disposed with a space therebetween in the X-axis direction, and the two sensors 50 are positioned at the predetermined positions, respectively, by a stand 51 and frame 52. The sensor 50 supported by the stand 51 is disposed at a side of the object 100, and the sensor 50 supported by the frame 52 is disposed above the object 100.

Examples of the sensor 50 may be a two-dimensional camera, three-dimensional camera, three-dimensional distance sensor, or the like. The sensors 50 according to this embodiment are two-dimensional cameras, and each of the sensors 50 sequentially transmits image data to the work robot controller 20. As will be described later, the work robot control unit 21 is able to detect position and orientation of a detection target O in the image data.

When setting the reference coordinate system 201, a setting tool provided at a distal end of the work robot 10 touches a plurality of predetermined portions of a calibration jig disposed at a certain position over the conveyer device 2. With this, the reference coordinate system 201 is set. In this embodiment, directions in which an X axis, a Y axis, and a Z axis of the reference coordinate system 201 extend respectively correspond to the directions in which the X axis, the Y axis, and the Z axis in FIG. 1 extend, and a position of the reference coordinate system 201, that is, a position of an origin point corresponds to a predetermined position on the calibration jig.

Further, the calibration jig is attached to a known position on the work robot and positioned in front of the two sensors 50, each of the two sensors 50 obtains image data of the calibration jig, and the reference coordinate system 201 of the work robot 10 and positions and orientations (sensor coordinate systems 203 and 204) of the sensors 50 are associated. Alternatively, it is possible to provide a configuration in which the calibration jig is provided at a known position seen from the two sensors 50, each of the two sensors 50 obtains image data of the calibration jig, and the reference coordinate system 201 of the work robot 10 and the positions and orientations (the sensor coordinate systems 203 and 204) of the sensors 50 are associated.

Here, a jig other than the calibration jig may be used when setting the reference coordinate system.

The storage unit 23 of the work robot controller 20 stores a system program 23a, and the system program 23a is responsible for a basic function of the work robot controller 20. Further, the storage unit 23 stores a work operation program 23b. Moreover, the storage unit 23 stores the force control program 23c and a measurement program 23d.

The work robot control unit 21 monitors a position or a movement amount of the target part 101, based on the programs 23a and 23d, using the data detected by the sensors 50. Further, the work robot control unit 21 transmits a control command for performing a predetermined operation on the object 100 to the servo controllers 24 and 25, based on the programs 23a, 23b and 23c. With this, the work robot 10 and the hand 30 perform the predetermined operation to the object 100.

Figure 4:
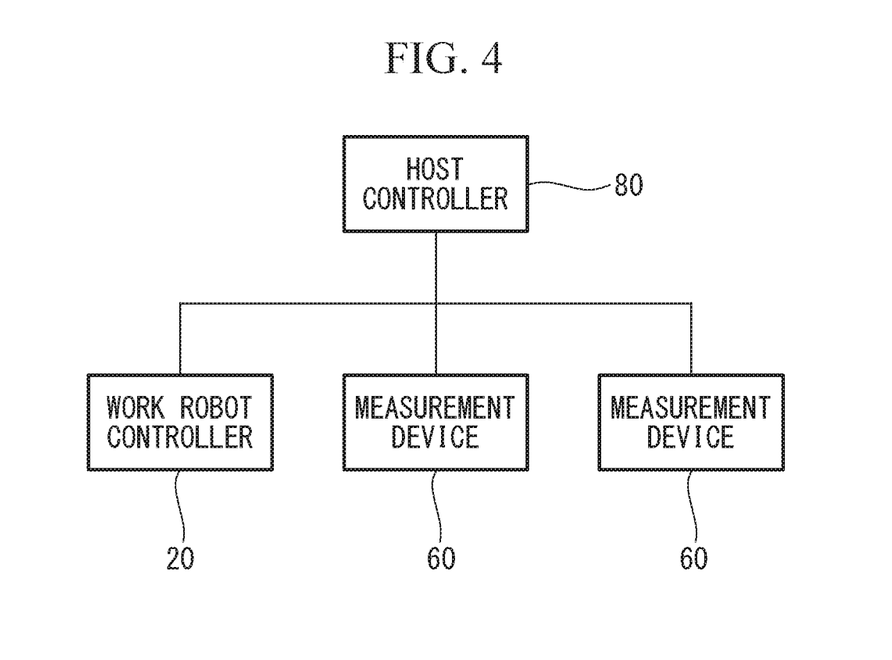
FIG. 4 is a view illustrating another example of a configuration of a control system according to this embodiment.

Here, as illustrated in FIG. 4, the work robot controller 20 and the measurement devices 60 may be connected to the host controller 80. The host controller 80 is a computer having a processor, a storage unit such as a RAM or a hard disk, an input unit, and a transceiving unit. An operating condition of the work robot 10 and operating conditions of the measurement devices 60 are transmitted to the host controller 80. Data for a position and a movement amount of the target part 101 monitored by the sensors 50 and a measurement controller, and data relating to the data described later, are also transmitted sequentially to the host controller 80. Further, the data is sequentially transmitted from the host controller 80 to the work robot controller 20. Moreover, other data received by the host controller 80 is also transmitted sequentially from the host controller 80 to the work robot controller 20.

Here, if the host controller 80 is not provided, the controllers directly communicate with each other.

Figure 5:
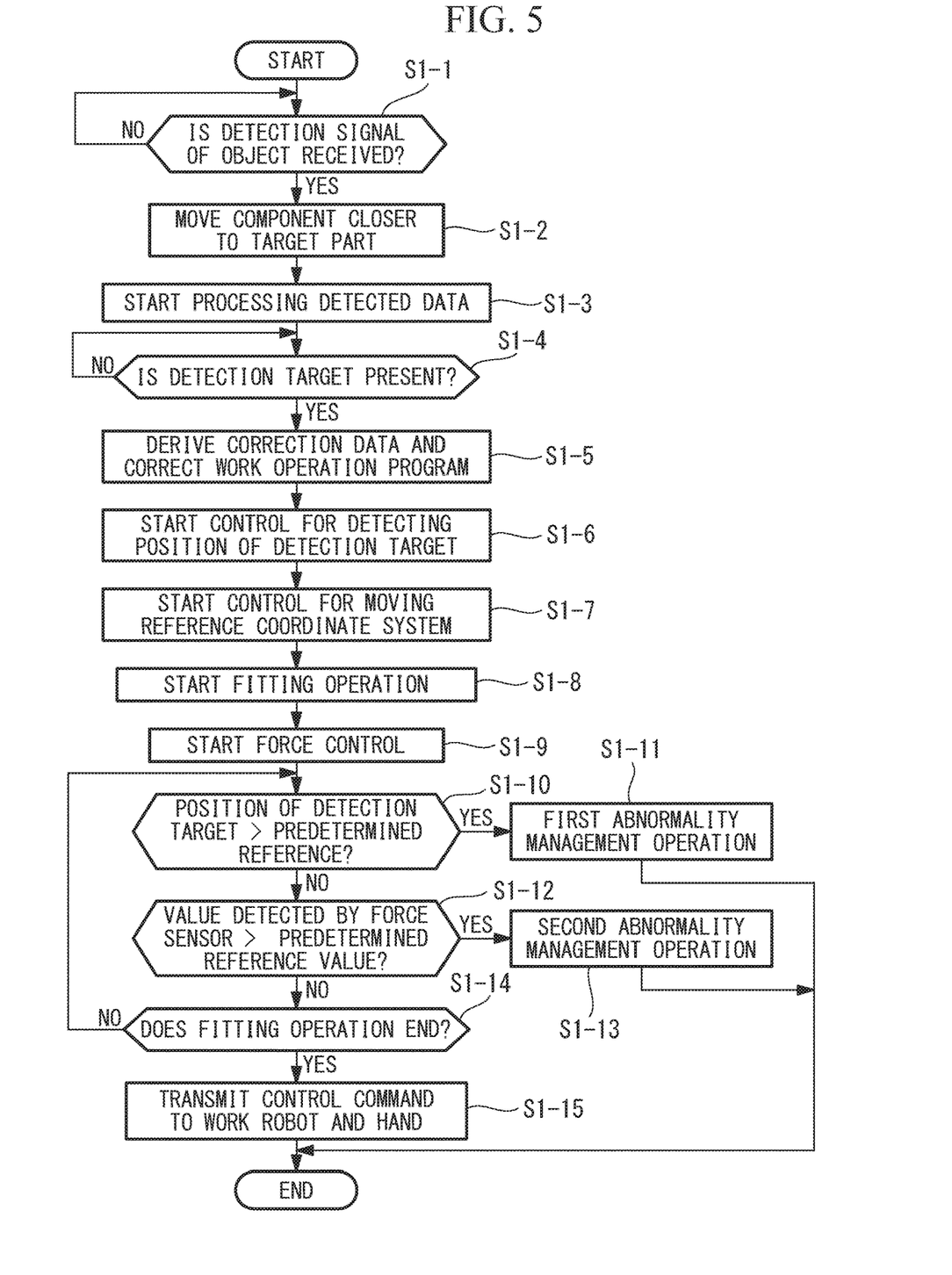
FIG. 5 is a flowchart showing an example of a process of the work robot and a controller of a measurement device according to this embodiment.

A process by the work robot control unit 21 when the work robot 10 performs the predetermined operation to the object 100 will be described with reference to a flowchart in FIG. 5. Here, the following control is performed in a state in which the object 100 is being moved by the conveyer device 2.

First, upon reception of a detection signal of the object 100 by the detection device 40 (Step S1-1), the work robot control unit 21 transmits, based on the work operation program 23b, control commands to the servo controllers 24 for moving the component 110 held by the hand 30 closer to the target part 101 (Step S1-2).

In order to perform the control in Step S1-2, the work robot control unit 21 uses data of a position of the robot with respect to the target part 101 within the object 100 and the detection target O. Here, the position of the robot may be corrected using an approximate moving speed of the conveyer device 2 that has been previously set, or using a moving speed of the conveyer device 2 obtained by the operation position detection device 2b.

Further, the work robot control unit 21 starts processing the data detected by the sensors 50 based on the measurement program 23d (Step S1-3). In this embodiment, detection targets O are prepared respectively for the two sensors 50, and one of the two detection targets O is a mark provided on the side of the object 100, and the other is a mark provided on an upper surface of the object 100 (FIG. 1).

The detection targets O are not limited to them as long as their positions and orientations relative to the target part 101 do not change.

Subsequently, upon presence of the detection targets O within angles of view of the sensors 50 (Step S1-4), the work robot control unit 21 performs first processing, based on the measurement program 23d, for deriving correction data for position coordinates and orientation of the target part 101 based on measurement of the detection targets O, and for correcting the work operation program 23b using the correction data (Step S1-5). At the same time or immediately after the first processing, the work robot control unit 21 starts second processing for detecting positions and moving speeds of the detection targets O (Step S1-6), and for moving the reference coordinate system 201 (Step S1-7).

First Processing

The work robot control unit 21 detects, using the image data from the sensors 50, the position or the position and orientation of the detection targets O in the reference coordinate system 201. Then, the work robot control unit 21 obtains correction data for the first processing from the association between the previously given reference and the actual detection result. The position and orientation of each of the detection targets O with respect to the target part 101 does not change, and therefore the correction data can be used as correction data for the target part 101.

Figure 6:
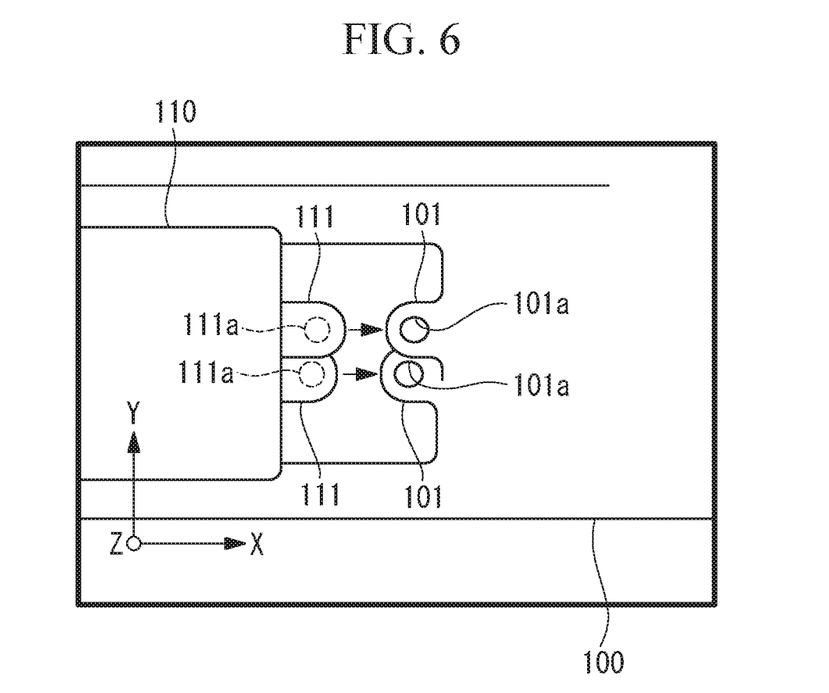
FIG. 6 is a plan view of a target part of an object and an attachment portion of a component according to this embodiment.

The work robot control unit 21 corrects the work operation program 23b, using the obtained correction data for the position coordinates and the orientation. Here, it is possible to correct only the position coordinates, or to correct only the orientation. With this, when the hand 30 fits the shaft 111a of the component 110 into the hole 101a of the target part 101 (FIG. 6) by the control that will be described later, it is possible to improve accuracy of the fitting.

Second Processing

In order to perform Step S1-6 and S1-7 as the second processing, the following control may be used, for example. In this embodiment, the following control is referred to as a position-based method. It should be understood that Step S1-6 and S1-7 may be performed using another type of control. While the positions of the detection targets O are detected from the data detected by the sensors 50 in the following control in this embodiment, the position and orientation of each of the detection targets O can be detected from the data detected from the sensors 50.

In the control of the position-based method, positions or a position of a characteristic shape and/or a characteristic point of the object 100 over the fixed reference coordinate system 201 are sequentially detected using image data sequentially obtained as detected data of the sensors 50. In this embodiment, the position of the target part 101 of the object 100 is sequentially detected based on the detection result of the position of each detection target O whose position and orientation relative to the target part 101 do not change. Here, the orientation of the target part 101 may be sequentially detected at the same time. Then, the work robot control unit 21 sequentially moves the reference coordinate system 201 based on a difference between the detected positions on the reference coordinate system 201 that move over time (for example, a difference between a current detected position and a detected position at one time in the past).

Here, while it is necessary to perform image processing over an entire detection range of the sensors 50 in order to detect the positions of the detection targets O within the detection range in the first processing, in the second processing, as approximate positions of the detection targets O may be identified, it is possible to perform image processing only to a part of the detection range, and thus to improve processing speed.

In this embodiment, when control by the position-based method is performed, the detection targets O are always positioned within the angles of view of the respective sensors 50. It should be noted that, when the detection target O moves in the X-axis direction and the Y-axis direction seen from the sensor 50 disposed above the object 100, the reference coordinate system 201 also moves in the X-axis direction and the Y-axis direction. When the detection target O moves in the X-axis direction and in the Z-axis direction seen from the sensor 50 disposed on the side of the object 100, the reference coordinate system 201 also moves in the X-axis direction and the Z-axis direction. Here, when the positions of the two detection targets O rotate about an axis extending in a direction such as the Z-axis direction and the Y-axis direction, the orientation of the reference coordinate system 201 is also rotated about this axis.

As described above, when the setting position, for example, the position of the origin point, of the reference coordinate system 201 is sequentially moved along with the movement of the positions of the detection targets O, the work robot control unit 21 is able to control the work robot 10 without correcting the work operation program 23b.

Figure 7:
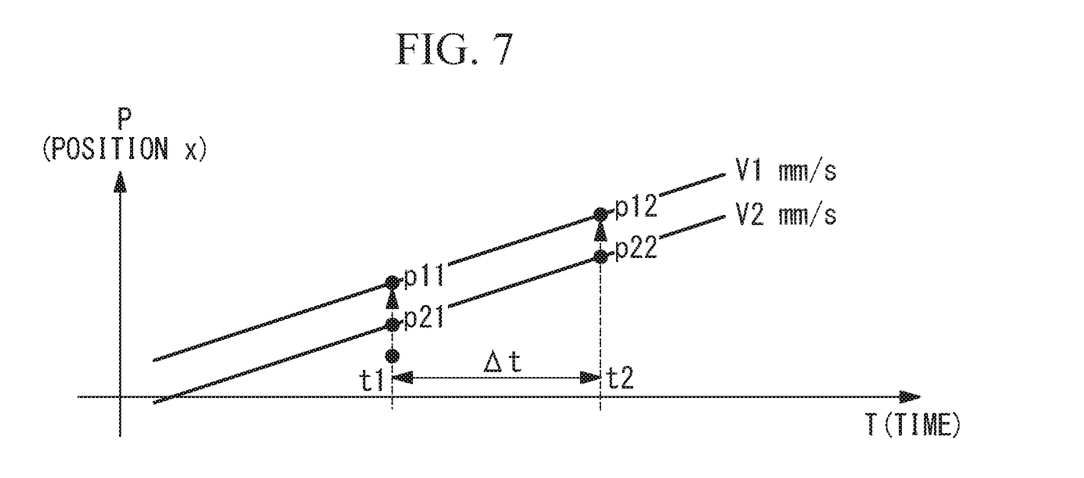
FIG. 7 is a chart explaining a coordinate system of tracking control of the work robot system according to this embodiment.

In the above control, when positions p11 and p21 of the two detection targets O move to positions p12, p22, . . . , respectively, as illustrated in FIG. 7, for example, the work robot control unit 21 calculates the moving speeds of the two detection targets O by fitting based on the least-square method. Alternatively, an average moving speed may be calculated by averaging the moving speeds of the two detection targets O. A movement amount is obtained by multiplying the obtained moving speed by time.

It is possible to interpolate the setting positions for moving the reference coordinate system 201 using the movement amount.

Further, the central position of the two detection targets O within the reference coordinate system 201 may be used as the detected positions of the two detection targets O. When the number of the detection targets O is three or more, the barycentric position of the three or more detection targets O may be used as the detected positions of the detection targets O. By using the central position or the barycentric position of the plurality of detection targets O, it is possible to reduce influences of detection errors of the object 100 and the like.

Thereafter the work robot control unit 21 starts transmission of control commands to the servo controllers 24, based on the work operation program 23b, for fitting the shaft 111a of the component 110 within the hole 101a of the target part 101 (Step S1-8).

Here, the work operation program 23b in this embodiment is a program for sequentially changing the position and orientation of the shaft 111a of the component 110 in the reference coordinate system 201.

In the control with which the setting position of the reference coordinate system 201 is sequentially adjusted by the detection results by the sensors 50, while the target part 101 of the object 100 is being moved by the conveyer device 2, the target part 101 does not move when it is seen from the reference coordinate system 201.

In the state of the above control, the work robot control unit 21 starts force control based on the force control program 23c (Step S1-9). As the force control, a known force control method can be used. In this embodiment, the work robot 10 moves the component 110 in a direction to escape from a force detected by the force sensor 32. An amount of movement here is determined by the work robot control unit 21 based on a value detected by the force sensor 32.

For example, when a force in a direction opposite from a carrying direction by the conveyer device 2 is detected by the force sensor 32 in a state in which the shaft 111a of the component 110 held by the hand 30 starts to be fitted into the hole 101a of the object 100, the work robot 10 slightly moves the component 110 to the direction opposite from the carrying direction to escape from the detected force.

Subsequently, the work robot control unit 21 performs first abnormality management operation (Step S1-11) when the position of the detection target O with respect to the sensor 50 changes beyond a predetermined reference (Step S1-10). Examples of the change beyond the predetermined reference include the detection target O moving largely within the image data, the detection target O moving faster than a predetermined speed within the image data, and loss of the detection target O at unintended timing. In a case in which power supply is unstable, a rotational speed of the motor 2a often declines quickly, and the rotational speed of the motor 2a often changes to a large extent. In such a case, the position of the detection target O with respect to the sensor 50 changes beyond the predetermined reference.

It should be noted that Steps S1-10 and S1-11 may be performed before the fitting operation (Step S1-8) starts.

As the first abnormality management operation, the work robot control unit 21 performs various operations such as for reducing a cycle of force control or for improving sensitivity, stopping progress of fitting, and stopping the fitting operation. Shortening the cycle of force control or improving sensitivity allows more sensitive movement of the work robot 10 with respect to force applied to the component 110. In this embodiment, the work robot control unit 21 performs various operations such as for stopping the fitting operation, for evacuation operation, for stopping the conveyer device, and a combination of these.

Further, when the value detected by the force sensor 32 exceeds a value of the predetermined reference (Step S1-12), the work robot control unit 21 performs second abnormality management operation (Step S1-13). When the value detected by the force sensor 32 exceeds the value of the predetermined reference, an abnormal force is likely to be applied to the component 110 and the object 100. Therefore, as the second abnormality management operation, the work robot control unit 21 performs various operations such as for evacuation operation or stopping the work robot 10, for moving the work robot 10 at low speed in the direction to escape from a direction of the force detected by the force sensor 32, for stopping the conveyer device 2, for moving the hand 30 away from the component 110, and a combination of these. In this embodiment, the work robot control unit 21 performs an operation for stopping the work robot 10 and the conveyer device 2.

On the other hand, the work robot control unit 21 determines whether or not the fitting operation has been finished (Step S1-14), and if it is determined that the fitting operation has been finished, transmits a control command to the work robot 10 and the hand 30 (Step S1-15). With this, the hand 30 moves away from the component 110, and the hand 30 is moved by the work robot 10 to a standby position or a position at which next component 110 is stocked.

The moving speed of the detection target O obtained in Step S1-6 may be used in a case in which the position of the detection target O cannot be detected by the two sensors 50. For example, the work robot control unit 21 is able to change the setting position of the reference coordinate system 201, using the positions of the two detection targets O that have been detected immediately before and the moving speed calculated before the detection target O becomes out of sight.

Here, a processing tool may be supported at the distal end of the work robot 10, and the work robot 10 may carry out processing as the predetermined operation to the object 100 moved by the conveyer device 2. In this case, examples of the processing tool include a drill tool, a milling tool, da rill tap, a deburring tool, and tools of other types. In this case, similarly, the same effects as described above may be obtained by moving the processing tool closer to the target part 101 in Step S1-2, and by performing the force control according to the contact between the processing tool and the target part 101 in Step S1-9.

Further, a different controller may perform detection and the like of the positions or the position of the characteristic shape and/or the characteristic point of the object 100 in Step S1-5 and Step S1-6.

Moreover, it is possible to obtain correction data for the first processing, when the positions of the detection targets O are sequentially detected in the second processing. In this case, the first processing (Step S1-4) is not necessary.

As described above, in this embodiment, the sensors 50 are disposed at the predetermined positions, and the position of the target part 101 on the object 100 is sequentially detected using the data detected by the sensors 50. Then, the work robot 10 is controlled using the position of the target part 101 that is sequentially detected in this manner. Therefore, even when the force control is not performed, the work robot control unit 21 is able to recognize a positional relation between the component 110 or the tool supported by the work robot 10 and the object 100, and possibly recognize whether or not the component 110 or the tool is in contact with and the object 100. For example, the work robot control unit 21 is also able to recognize an abnormality of the conveyer device 2 in which the movement amount of the object 100 by the conveyer device 2 changes greatly in the state in which the force control is not performed. Therefore, it is possible to realize prevention of damages to the work robot 10, the conveyer device 2, the object 100, and the like without trying to shorten the cycle of force control, and thus unexpected oscillation of the work robot 10 is reduced.

Here, it is possible to consider that accuracy of the detection of the position of the target part 101 using the data detected by the sensor 50 may be improved when the sensor 50 is supported by the distal end of the work robot 10, or by a distal end of a robot different from the work robot 10, and when the robot changes the position and orientation of the sensor 50 according to carrying by the conveyer device 2. However, if the sensor 50 is supported at a distal end of the robot, the position and orientation of the sensor 50 is often not correct due to calibration accuracy of the robot, an influence of deflection of the robot, absolute accuracy of the robot, and the like. By contrast, in this embodiment, the sensors 50 are disposed at the predetermined positions by supporting members such as the stand 51 and the frame 52. Therefore, as compared to the case in which the sensor 50 is supported at the distal end of the robot, it is possible to improve accuracy of the detection of the position of the target part 101 using the data detected by the sensor 50.

It should be noted that it is possible to employ both the sensor 50 supported at the distal end of the robot, and the sensors 50 disposed at the predetermined positions by supporting members such as the stand 51 and the frame 52. For example, the sensor 50 supported by the frame 52 in this embodiment may be supported by a robot different from the work robot 10. In this case, the robot may change the position and orientation of this sensor 50 according to the carrying by the conveyer device 2. If there are possibilities of a change in moving speed in the X-axis direction and oscillation in the Z-axis direction for the object 100 carried by the conveyer device 2, it is possible to correctly detect the change in moving speed and the and oscillation of the target part 101 using the sensor 50 supported by the stand 51. In other words, by providing the sensor 50 supported by the stand 51, it is possible to enhance the detection of the position of the target part 101 using the sensor 50 supported by the robot.

Further, when the sensor 50 is supported at the distal end of the work robot 10 along with the component 110 or the tool, the angle of view (detection range) of the sensor 50 may often be blocked by the component 110 or the tool. There is a case in which the target part 101 or its neighborhood cannot be detected by the sensor 50 when the component 110 or the tool is brought into contact with the object 100. In this embodiment, the sensor 50 is not supported by the work robot 10. Therefore, the possibility that the detection range of the sensor 50 is blocked by the component 110 or the tool may be reduced, and it is possible to improve a condition of the detection of the target part 101 or its neighborhood by the sensor when the component 110 or the tool is brought into contact with the object 100.

Further, if the sensor 50 is supported at the distal end of the work robot 10 along with the component 110 or the tool, the sensor 50 must be removed from the work robot 10 when cleaning or repairing the tool or the work robot 10. In this case, it is necessary to perform calibration of the sensor 50 when the sensor 50 is again attached to the work robot 10. In this embodiment, as the sensor 50 is not supported by the work robot 10, it is possible to reduce or eliminate time and effort for calibration of the sensor 50.

Moreover, in this embodiment, by using the detection result of the sensors 50, the work robot control unit 21 causes the component 110 or the tool of the work robot 10 to follow the target part 101. Therefore, when the work robot 10 performs the predetermined operation, the work robot control unit 21 is able to correctly control the position and orientation of the component 110 or the tool supported by the work robot 10 with respect to the target part 101 of the object 100 carried by the conveyer device 2. This is advantageous in order to realize prevention of damages to the work robot 10, the conveyer device 2, the object 100, and the like without shortening the cycle of force control, or without increasing sensitivity, as well as to suppress unexpected oscillation of the work robot 10.

Moreover, in this embodiment, the position of the target part 101 may be sequentially detected by causing the sensor 50 to detect the detection target O whose position relative to the target part 101 does not change. Therefore, it is possible to sequentially detect the position of the target part 101 even when the target part 101 is covered by the component 110 or the tool. This is highly advantageous in order to improve accuracy in operations by the work robot 10.

Furthermore, in this embodiment, there is provided the detection device 40 that detects at least the position of the object 100 on the conveyer device 2, and the work robot control unit 21 moves the component 110 or the tool of the work robot 10 closer to the target part 101, based on the detection result of the detection device 40. Here, when moving closer, the work robot may change the orientation of the component 110 or the tool according to the orientation of the target part.

By causing the work robot 10 to operate in this manner based on the detection result of the detection device 40, it is possible to improve efficiency of operations. At this time, if the work robot control unit 21 moves the component 110 supported by the work robot 10 closer to the target part 101 using the detection result of the operation position detection device 2b, the control described above becomes more accurate.

Further, in this embodiment, the work robot control unit 21 performs abnormality management operation when the position of the target part 101 or the detection target O seen from the sensor 50 changes beyond the predetermined reference.

According to this configuration, in a state in which a positional relation between the component 110 or the tool supported by the work robot 10 and the object 100 is recognized, the work robot control unit 21 further performs abnormality management operation based on the detection result of the sensor 50. This configuration is advantageous in order to realize reliable prevention of damages to the work robot 10, the conveyer device 2, the object 100, and the like, as well as to suppress unexpected oscillation of the work robot 10.

While the detection device 40 in this embodiment is a photoelectric sensor, the detection device 40 may be a two-dimensional camera, a three-dimensional camera, a three-dimensional distance sensor, a sensor that measures a shape by projecting line light to an object, disposed above, on the side of, or under the conveyer device 2. If the detection device 40 is a two-dimensional camera, the work robot control unit 21 is able to recognize the position, possibly the orientation, of the target part 101 of the object 100 carried by the conveyer device 2, based on the image data as the detection result of the detection device 40. Therefore, in Step S1-2, the work robot control unit 21 is able to move the shaft 111a of the component 110 closer to the hole 101a of the target part 101 more correctly.

Further, as the conveyer device 2, it is possible to use a conveyer device that carries the object 100 along a curved route, or a conveyer device that carries the object 100 along a winding route. In these cases, similarly, the work robot control unit 21 is able to cause the component 110 supported by the work robot 10 to follow the target part 101, by using the detection result of the sensor 50. Moreover, when the position of the detection target O with respect to the sensor 50 changes beyond the predetermined reference in Step S1-10, the work robot control unit 21 is able to perform first abnormality management operation in Step S1-11. In other words, the same effects as described above may be obtained even when the conveyer device described above is used.

It should be noted that Steps S1-10 and S1-11 may be performed before the fitting operation (Step S1-8) starts.

Here, obtaining of the position in Step S1-6 is calculated based on image data captured by the sensor 50. Therefore, a cycle of obtaining the position is influenced by a cycle of image taking by the sensor 50. By contrast, it also is possible to sequentially interpolate the position obtained based on the image data captured by the sensor 50. For example, the work robot control unit 21 identifies tendency of change in the position and movement amount using detection result of a plurality of successive positions. Then, the work robot control unit 21 is able to set an interpolated position between the detected positions according to the identified tendency.

In Step S1-11, the work robot control unit 21 may perform an operation such as stopping the motor 2a of the conveyer device 2, decelerating the motor 2a of the conveyer device 2, or the like, as the first abnormality management operation.

In this embodiment, the force sensor 32 is attached to the distal end of the work robot 10. On the other hand, it is also possible to position the force sensor 32 within the hand 30, within the robot 10, between the conveyer device 2 and the object 100, within the object 100, or the like. In this case, similarly, it is possible to perform force control based on the value detected by the force sensor 32, and the same effects as described above may be obtained.

Figure 8:
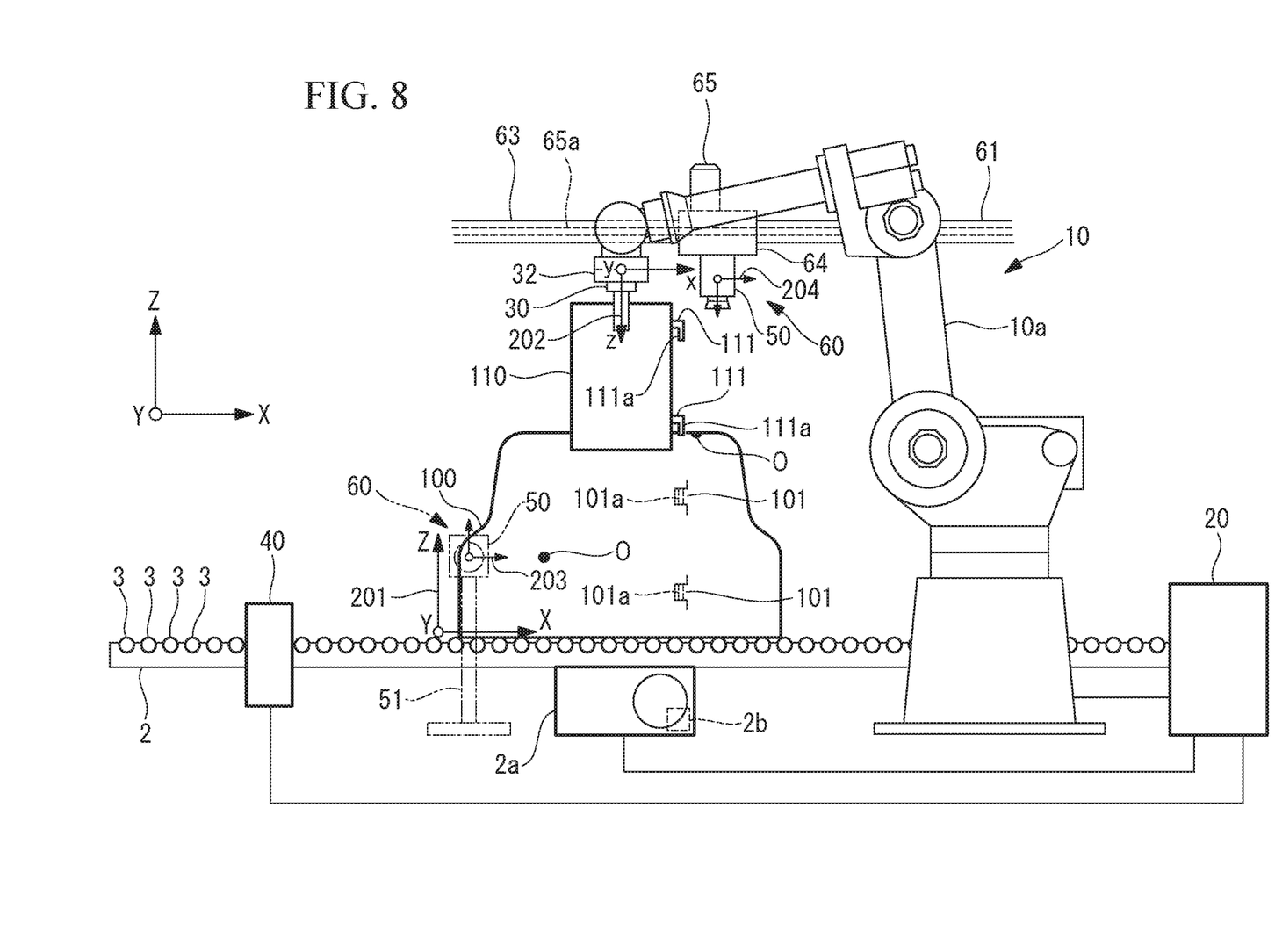
FIG. 8 is a view illustrating a configuration of a modified example of the work robot system according to this embodiment.

Further, in place of the frame 52, it is possible to employ a moving device 61 for moving the sensor 50. For example, as illustrated in FIG. 8, the moving device 61 includes a rail 63 extending in the X-axis direction, a slider 64 supported by the rail 63, and a servomotor 65 and a ball screw 65a that move the slider 64 along the rail 63. In this case, the moving device 61 is able to fix the position and orientation of the sensor 50 when control based on the position-based method is performed.

It should be noted that, in this embodiment, the two sensors 50 detect the detection targets O provided above and on the side of the object 100, respectively. By contrast, it is possible to provide a sensor 50 that detects a detection target O on a back side of the object 100. In this case, a three-dimensional position and orientation of the target part 101 may be detected.

It should be noted that, this embodiment, when the detection by one of the sensors 50 is not performed for some reason, control based on the position-based method may be performed using only the data detected by the other of the sensors 50. Further, the sensors 50 may be arranged side by side in the carrying direction of the conveyer device 2, and the sensor 50 used for control based on the position-based method may be sequentially switched.

Figure 3:
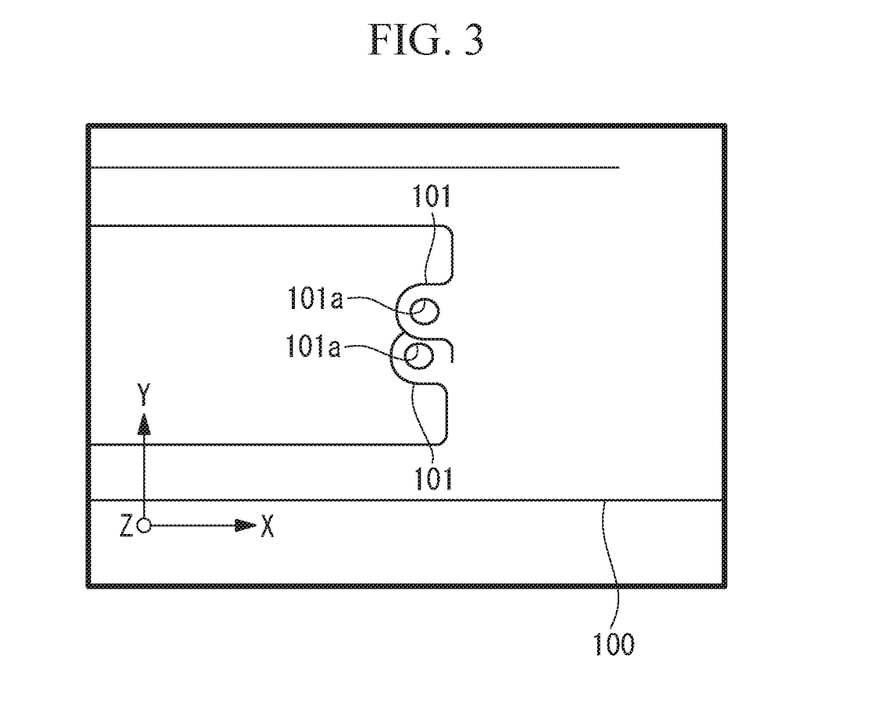
FIG. 3 is an example of image data captured by a sensor of a measuring robot system according to this embodiment.

It should be noted that, when the target part 101 is detected by both or one of the sensors 50, instead of detecting the detection targets O respectively by the two sensors 50, the work robot control unit 21 is able to identify the position of at least one of the two target parts 101 by employing a known image processing method, for example, using the image data shown in FIG. 3. Further, the work robot control unit 21 is able to identify the orientation of the target part 101, based on a characteristic shape or plurality of characteristic points of the target part 101 within the image data shown in FIG. 3.

Moreover, in Step S1-7 as a part of the second processing, the operation program 23b may be corrected, instead of moving the reference coordinate system 201. In this case, the work robot control unit 21 sequentially corrects instruction points of the operation program 23b that is previously instructed with regard to the reference coordinate system 201, based on a difference between a reference position and an actual position (detected position) on the reference coordinate system 201. In this case, similarly, the same effects as described above may be obtained.

From the above-described embodiments, the following aspects of the present disclosure are derived.

A work robot system according to a first aspect of the present disclosure includes: a conveyer device configured to move an object; a work robot configured to perform a predetermined operation to a target part on the object moved by the conveyer device; a work robot controller configured to control the work robot; a sensor disposed at a predetermined position, and configured to detect a position of one of the target part on the object moved by the conveyer device and a detection target whose position does not change relative to the target part; and a force detector configured to detect a force generated when the object comes into contact with one of a component and a tool that are supported by the work robot, wherein when the predetermined operation is performed by the work robot, the work robot controller performs force control based on a value detected by the force detector while controlling the work robot based on the detected position of one of the target part and the detection target.

According to this aspect, the sensor is disposed at a predetermined position, and the position of the target part on the object or the detection target is detected. Then, the work robot is controlled using the position of the target part or the detection target that is detected in this manner. Therefore, even when the force control is not performed, the work robot controller is able to recognize a positional relation between the component or the tool supported by the work robot and the object, and possibly recognize whether or not the component or the tool is in contact with and the object. For example, the work robot controller is also able to recognize an abnormality of the conveyer device in which the movement amount of the object by the conveyer device changes to a large extent in a state in which the force control is not performed. Therefore, it is possible to realize prevention of damages to the work robot, the conveyer device, the object, and the like without forcibly shortening the cycle of force control, and thus unexpected oscillation of the work robot is reduced.

Here, it is possible to consider that accuracy of the detection of the position of the target part using the data detected by the sensor may be improved when the sensor is supported by the distal end of the work robot, or by a distal end of a robot different from the work robot, and when the robot changes the position and orientation of the sensor according to the move by the conveyer device. However, if the sensor is supported at a distal end of the robot, the position and orientation of the sensor is often not correct due to calibration accuracy of the robot, an influence of deflection of the robot, absolute accuracy of the robot, and the like. By contrast, in this embodiment, the sensor is disposed at the predetermined position. Therefore, as compared to the case in which the sensor is supported at a distal end of the robot, it is possible to improve accuracy of the detection of the position of the target part using data detected by the sensor.

Further, when the sensor is supported at the distal end of the work robot along with the component or the tool, a detection range of the sensor may often be blocked by the component or the tool. There is a case in which the target part or its neighborhood cannot be detected by the sensor when the component or the tool is brought into contact with the object. According to this aspect, the sensor is not supported by the work robot. Therefore, the possibility that the detection range of the sensor is blocked by the component or the tool may be reduced.

Further, if the sensor is supported at the distal end of the work robot along with the component or the tool, the sensor must be removed from the work robot when cleaning or repairing the tool or the work robot. In this case, it is necessary to perform calibration of the sensor when the sensor is reattached to the work robot. According to this aspect, as the sensor is not supported by the work robot, it is possible to reduce or eliminate time and effort for calibration of the sensor.

In the aspect described above, preferably, the work robot controller performs the force control using the value detected by the force detector, while causing one of the component and the tool that are supported by the work robot to follow the target part using a detection result of the sensor.

In this manner, by using the detection result of the sensor, the work robot controller causes the component or the tool of the work robot to follow the target part. Therefore, when the work robot performs the predetermined operation, the work robot controller is able to correctly control the position and orientation of the component or the tool supported by the work robot with respect to the target part of the object carried by the conveyer device. This is advantageous in order to realize prevention of damages to the work robot, the conveyer device, the object, and the like without shortening the cycle of force control, or without increasing sensitivity, as well as to suppress unexpected oscillation of the work robot.

Preferably, the aspect described above is further provided with a detection unit configured to detect at least a position of the object on the conveyer device, wherein the work robot controller moves one of the component and the tool of the work robot toward the target part, based on a detection result of the detection unit. Here, when moving toward the target part, the work robot may change the orientation of the component or the tool according to the orientation of the target part.

By causing the work robot to operate in this manner based on the detection result of the detection unit, it is possible to improve efficiency of operations.

In the aspect described above, preferably, at least one of the work robot controller and the conveyer device performs abnormality management operation, when the detected position of one of the target part and the detection target changes beyond a predetermined reference.

According to this aspect, as described above, in a state in which a positional relation between the component or the tool supported by the work robot and the object is recognized, at least one of the work robot controller and the conveyer device further performs abnormality management operation based on the detection result of the sensor. This configuration is advantageous when reliably realizing prevention of damages to the work robot, the conveyer device, the object, and the like, as well as to suppress unexpected oscillation of the work robot.

A second aspect of the present disclosure provides a work robot including: an arm configured to perform a predetermined operation to a target part on an object moved by a conveyer device; a work robot controller configured to control the arm; and a force detector configured to detect a force generated when the object comes into contact with one of a component and a tool that are supported by the arm, wherein the work robot controller receives data from a measurement device having a sensor configured to detect a position of one of the target part moved by the conveyer device and a detection target whose position does not change relative to the target part, the data relating to the position, and when the predetermined operation is performed by the arm, the work robot controller performs force control based on a value detected by the force detector while controlling the arm using the data relating to the position.

According to the aforementioned aspects, it is possible to efficiently realize prevention of damages to a robot, a conveyer device, an object, and the like.

The invention claimed is:

1. A work robot system comprising:
   a conveyer device configured to move an object;
   a work robot configured to perform a predetermined operation to a target part on the object moved by the conveyer device;
   a work robot controller configured to control the work robot;
   a first sensor disposed at a predetermined first position, and configured to detect a position of a first detection target on a first surface of the object moved by the conveyer device, wherein the first detection target is different from the target part and the position of the first detection target does not change relative to the target part;
   a second sensor disposed at a predetermined second position, and configured to detect a position of a second detection target on a second surface of the object moved by the conveyer device, wherein the second detection target is different from the target part and the position of the second detection target does not change relative to the target part; and a force detector configured to detect a force generated when the object comes into contact with one of a component and a tool that are supported by the work robot, wherein when the predetermined operation is performed by the work robot, the work robot controller performs force control based on a value detected by the force detector while causing one of the component and the tool that are supported by the work robot to follow the target part using the position of the first detection target and the position of the second detection target.

2. The work robot system according to claim 1, further comprising a detection unit configured to detect at least a position of the object on the conveyer device, wherein the work robot controller moves one of the component and the tool of the work robot toward the target part, based on a detection result of the detection unit.

3. The work robot system according to claim 1, wherein at least one of the work robot controller and the conveyer device performs an abnormality management operation when the detected position of one of the first detection target and the second detection target changes beyond a predetermined reference.

4. A work robot comprising:

an arm configured to perform a predetermined operation to a target part on an object moved by a conveyer device;

a work robot controller configured to control the arm; and a force detector configured to detect a force generated when the object comes into contact with one of a component and a tool that are supported by the arm, wherein the work robot controller receives data related to a position of a first detection target and a position of a second detection target from a measurement device, the measurement device having a first sensor configured to detect the position of the first detection target on a first surface of the object moved by the conveyer device and a second sensor configured to detect the position of the second detection target on a second surface of the object moved by the conveyer device, the first detection target and the second detection target are different from the target part and the positions of the first detection target and the second detection target do not change relative to the target part, and when the predetermined operation is performed by the arm, the work robot controller performs force control based on a value detected by the force detector while causing one of the component and the tool that are supported by the arm to follow the target part using the position of the first detection target and the position of the second detection target.

* * * * *